United States Patent
Tsubaki et al.

(10) Patent No.: US 10,984,960 B2
(45) Date of Patent: Apr. 20, 2021

(54) ELECTROLYTIC CAPACITOR

(71) Applicant: Panasonic Intellectual Property Management Co., Ltd., Osaka (JP)

(72) Inventors: Yuichiro Tsubaki, Kyoto (JP); Tatsuji Aoyama, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 29 days.

(21) Appl. No.: 15/986,455

(22) Filed: May 22, 2018

(65) Prior Publication Data
US 2018/0277312 A1 Sep. 27, 2018

Related U.S. Application Data

(63) Continuation of application No. PCT/JP2016/004959, filed on Nov. 25, 2016.

(30) Foreign Application Priority Data

Dec. 4, 2015 (JP) .............................. JP2015-237123

(51) Int. Cl.
*H01G 11/04* (2013.01)
*H01G 9/035* (2006.01)
(Continued)

(52) U.S. Cl.
CPC .............. *H01G 11/04* (2013.01); *H01G 9/028* (2013.01); *H01G 9/035* (2013.01); *H01G 9/10* (2013.01);
(Continued)

(58) Field of Classification Search
CPC ........ H01G 11/04; H01G 11/86; H01G 11/80; H01G 11/60; H01G 11/56; H01G 9/10;
(Continued)

(56) References Cited

U.S. PATENT DOCUMENTS 6,307,735 B1 * 10/2001 Saito ...................... H01G 9/028
361/517
2005/0117276 A1 * 6/2005 Liu ........................ H01G 9/035
361/504

(Continued)

FOREIGN PATENT DOCUMENTS

JP 11-283874 10/1999
JP 2000-100670 4/2000
(Continued)

OTHER PUBLICATIONS

International Search Report of PCT application No. PCT/JP2016/004959 dated Feb. 7, 2017.

*Primary Examiner* — Nathan Milakovich
(74) *Attorney, Agent, or Firm* — McDermott Will and Emery LLP

(57) ABSTRACT

An electrolytic capacitor includes a capacitor element, a liquid component, an outer case, and a sealing body. The capacitor element includes an anode body having a dielectric layer, and a solid electrolyte layer in contact with the dielectric layer. The liquid component is in contact with the solid electrolyte layer. The outer case houses the capacitor element and the liquid component. The sealing body seals an opening of the outer case. The liquid component contains a first component, which is an aliphatic polyol compound having two or more hydroxy groups per molecule. The aliphatic polyol compound includes at least one of a compound having a $C_3$ carbon chain in a main chain and a compound having no $C_3$ carbon chain but having one to four ether oxygen atoms in a main chain. The sealing body includes a polymer having no double bond in a main chain.

8 Claims, 1 Drawing Sheet

(51) Int. Cl.
*H01G 11/60* (2013.01)
*H01G 11/80* (2013.01)
*H01G 11/56* (2013.01)
*H01G 9/10* (2006.01)
*H01G 9/028* (2006.01)
*H01G 9/15* (2006.01)
*H01G 11/86* (2013.01)
*H01G 9/145* (2006.01)

(52) U.S. Cl.
CPC ............. *H01G 9/151* (2013.01); *H01G 11/56* (2013.01); *H01G 11/60* (2013.01); *H01G 11/80* (2013.01); *H01G 11/86* (2013.01); *H01G 9/145* (2013.01)

(58) Field of Classification Search
CPC ........ H01G 9/151; H01G 9/035; H01G 9/028; H01G 9/145
See application file for complete search history.

(56) References Cited

U.S. PATENT DOCUMENTS

| | | |
|---|---|---|
| 2012/0250226 A1 | 10/2012 | Hirota et al. |
| 2012/0300368 A1* | 11/2012 | Matsuura ............... H01G 9/035 361/506 |
| 2014/0168857 A1 | 6/2014 | Sautter et al. |
| 2014/0334066 A1 | 11/2014 | Sugihara et al. |
| 2015/0213962 A1 | 7/2015 | Koseki et al. |
| 2015/0279503 A1* | 10/2015 | Scheel ................... H01G 11/48 361/529 |
| 2016/0240323 A1* | 8/2016 | Chacko ................. H01G 11/04 |
| 2016/0336117 A1* | 11/2016 | Koseki ................ H01G 9/0036 |
| 2016/0379760 A1* | 12/2016 | Wright ..................... H01G 9/06 361/525 |
| 2017/0053745 A1 | 2/2017 | Aoyama et al. |
| 2020/0135408 A1* | 4/2020 | Takatani ............... H01G 9/035 |

FOREIGN PATENT DOCUMENTS

| | | |
|---|---|---|
| JP | 2010-129864 | 6/2010 |
| JP | 2010-245463 | 10/2010 |
| JP | 2012-186452 A | 9/2012 |
| JP | 2014-195116 A | 10/2014 |
| WO | 2012/023257 | 2/2012 |
| WO | 2013/094462 | 6/2013 |
| WO | 2014/021333 | 2/2014 |
| WO | 2015/174056 | 11/2015 |

* cited by examiner

ELECTROLYTIC CAPACITOR

RELATED APPLICATIONS

This application is a continuation of the PCT International Application No. PCT/JP2016/004959 filed on Nov. 25, 2016, which claims the benefit of foreign priority of Japanese patent application No. 2015-237123 filed on Dec. 4, 2015, the contents all of which are incorporated herein by reference.

BACKGROUND

1. Technical Field

The present disclosure relates to an electrolytic capacitor including a solid electrolyte layer and a liquid component in contact with the solid electrolyte layer.

2. Description of the Related Art

As capacitors having a small size, a large capacitance, and low ESR (Equivalent Series Resistance), promising candidates are hybrid electrolytic capacitors including an anode body on which a dielectric layer is formed, a solid electrolyte layer formed so as to cover at least a part of the dielectric layer, and a liquid component. The electrolytic capacitors including the liquid component can increase a self-repairing function for a defect generated in the dielectric layer.

For the solid electrolyte layer, for example, a π-conjugated conductive polymer is used. On the other hand, for the liquid component, for example, use of ethylene glycol, γ-butyrolactone, or sulfolane has been proposed from the viewpoint of increasing withstand voltage characteristics of the electrolytic capacitor (see International Publication No. WO 2014/021333).

The electrolytic capacitor including a liquid component includes a capacitor element, the liquid component, and an outer case that houses the capacitor element and the liquid component, and an opening of the outer case is sealed with a sealing body. As a material for the sealing body, a butyl rubber (IIR) is used, for example. The butyl rubber is less likely to be permeated by the liquid component, so that the butyl rubber can suppress a decrease in the liquid component through vaporization when the electrolytic capacitor is exposed to a high temperature environment (see International Publication No. WO 2012/023257).

SUMMARY

An electrolytic capacitor according to the present disclosure includes a capacitor element, a liquid component, an outer case, and a sealing body. The capacitor element includes an anode body having a dielectric layer, and a solid electrolyte layer in contact with the dielectric layer. The liquid component is in contact with the solid electrolyte layer. The outer case houses the capacitor element and the liquid component. The sealing body seals an opening of the outer case. The liquid component contains a first component, which is an aliphatic polyol compound having two or more hydroxy groups per molecule. The aliphatic polyol compound includes at least one of a compound having a $C_3$ carbon chain in a main chain and a compound having no $C_3$ carbon chain but having one to four ether oxygen atoms in a main chain. The sealing body includes a polymer having no double bond in a main chain.

According to the present disclosure, there can be provided an electrolytic capacitor usable over a long period even in a high temperature environment exceeding, for example, 135° C.

DETAILED DESCRIPTION OF EMBODIMENT

Figure 1:
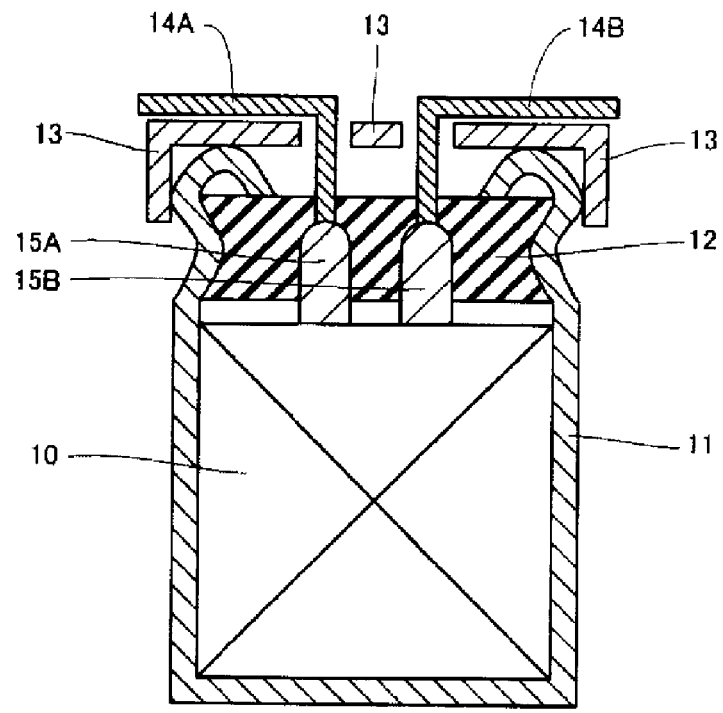
FIG. 1 is a schematic sectional view illustrating an electrolytic capacitor according to an exemplary embodiment of the present disclosure.

Prior to describing an exemplary embodiment of the present disclosure, problems with a conventional electrolytic capacitor are briefly described.

A hybrid electrolytic capacitor is at present required to have a heat resistance temperature ranging, for example, from about 80° C. to about 135° C. Vapor pressure of a liquid component increases in such a temperature range, and therefore vaporization of the liquid component is suppressed by using a butyl rubber as a material for a sealing body. On the other hand, the electrolytic capacitor is being required to have a higher heat resistance temperature than a heat resistance temperature of a conventional electrolytic capacitor, along with versatile applications of the electrolytic capacitor. For example, a development of an electrolytic capacitor for in-vehicle use, which has a heat resistance temperature exceeding 135° C., is being required.

A high temperature exceeding 135° C., however, is likely to cause deterioration of the sealing body. Thus, a crack in the sealing body may occur in a period during which the electrolytic capacitor is used. Such a crack largely declines a sealing property of the sealing body. And thus the liquid component is allowed to vaporize before fulfillment of the electrolytic capacitor's guaranteed life, causing an increase of ESR and a leakage current.

In view of the foregoing problems, the present disclosure provides an electrolytic capacitor usable over a long period even in a high temperature environment exceeding, for example, 135° C.

An electrolytic capacitor according to the present disclosure includes an anode body having a dielectric layer; a solid electrolyte layer in contact with the dielectric layer; a liquid component in contact with the solid electrolyte layer; an outer case that houses the anode body, the solid electrolyte layer, and the liquid component; and a sealing body that seals an opening of the outer case. The liquid component contains at least a first component, which contains an aliphatic polyol compound having two or more hydroxy groups per molecule. The aliphatic polyol compound includes a compound having a $C_3$ carbon chain in a main chain and/or a compound having no $C_3$ carbon chain but having one to four ether oxygen atoms in a main chain.

The first component is generally considered to be unsuitable for an electrolyte solution component because conductivity of the first component is small. On the other hand, a hybrid electrolytic capacitor includes a solid electrolyte layer in contact with a dielectric layer and thus does not necessarily require a high conductive liquid component. Thus, options for the liquid component can be increased. In the meanwhile, it is preferable to impart to the liquid component a function of increasing conductivity of the solid electrolyte layer when the liquid component has a low conductivity. The first component satisfies such a requirement and has an action of swelling a conductive polymer included in the solid electrolyte layer to increase the function of the conductive polymer.

It is considered that the conductive polymer swollen by the first component is likely to rearrange. And thus orientation or crystallinity of the conductive polymer can be improved. An improvement in the orientation or the crystallinity of the conductive polymer improves the conductivity of the solid electrolyte layer, and reduces ESR of the electrolytic capacitor. Further, presence of the first component improves contactability between the solid electrolyte layer and the dielectric layer so that withstand voltage characteristics of the electrolytic capacitor can be improved.

Organic solvents such as ethylene glycol and γ-butyrolactone also have an action of increasing the function of the conductive polymer. These organic solvents, however, have a high vapor pressure in a high temperature environment. Thus, usable materials for the sealing body are limited. Further, many of the usable materials have a low heat resistance. Thus it is difficult to maintain the sealing property in a high temperature environment. On the other hand, since the first component has a low vapor pressure in a high temperature environment, vaporization of the first component can be suppressed regardless of the material for the sealing body. That is, it is unnecessary to use, as the material for the sealing body, a material that is less likely to be permeated by an organic solvent, so that more options for the material can be allowed.

The polymer having no double bond in the main chain is likely to be permeated by an organic solvent, but is slow in deterioration even in a high temperature, so that the polymer can maintain the sealing property over a long period. Accordingly, when the first component, which is small in vapor pressure in a high temperature and is less likely to vaporize, is used, it is advantageous to use, as the material for the sealing body, the polymer having no double bond in the main chain, for increasing the heat resistance temperature of the electrolytic capacitor. On the other hand, the butyl rubber is excellent in being less likely to be permeated by the liquid component, but is likely to be deteriorated in a high temperature since the butyl rubber has a double bond in a main chain.

Hereinafter, the first component is further described. The aliphatic polyol compound used as the first component needs to have two or more hydroxy groups per molecule, preferably has three or more hydroxy groups per molecule, and may have four or more hydroxy groups from the viewpoint of largely increasing the function of the conductive polymer.

The aliphatic polyol compound is classified into a compound having a $C_3$ carbon chain in a main chain (component A) and a compound having no $C_3$ carbon chain but having one to four ether oxygen atoms in a main chain (component B). Either of these compounds may be used as the first component.

The $C_3$ carbon chain included in the component A has no branch structure and has a —(C—C—C)-structure forming no $C_4$ or more carbon chain and having all the three carbon atoms incorporated in the main chain. It is preferable that at least one, preferably two or three carbon atoms included in the $C_3$ carbon chain bonds with a hydroxy group. On the other hand, the ether oxygen atom(s) included in the component B is oxygen that forms an ether bond between carbon atoms, which is represented by —(C—O—C)—. The component B preferably has a —($CH_2CH_2$—O—$CH_2CH_2$)H structure. When a compound has these structures, a mutual action with the conductive polymer can be facilitated, so that an effect of increasing the function of the conductive polymer become high. Further the compound having these structures has a low vapor pressure, so that the compound is less likely to vaporize even in a high temperature environment. Meanwhile, the component A may also include an ether oxygen atom, and a number of the ether oxygen atoms included in the component A is not particularly limited.

As the aliphatic polyol compound, it is preferred to use specifically at least one selected from the group consisting of a compound classified into the component A, such as glycerol, polyglycerol, and glyceryl ether; a compound classified into the component B, such as polyalkylene glycol having five or less (preferably one to two) alkylene glycol unit (hereinafter, an alkylene glycol oligomer); and derivatives of these compounds. Polyglycerol is preferably, for example, diglycerol, triglycerol, tetraglycerol, and pentaglycerol. Glyceryl ether is preferably, for example, a condensate of monoalkyl($C_1$-$C_2$) glyceryl ether, glycerol, and a polyol. The alkylene glycol oligomer preferably has one or two ether oxygen atoms, and examples of the alkylene glycol oligomer include diethylene glycol and triethylene glycol. Examples of the derivatives of the alkylene glycol oligomer include monoglyceryl ether and diglyceryl ether that are derived from the alkylene glycol oligomer. These compounds may be used alone, or two or more of the compounds may be used in combination.

Especially, glycerol, polyglycerol, or derivatives of these compounds are preferably used, in terms of facilitating stabilization of quality of the first component. A weight average molecular weight of polyglycerol or the derivatives of polyglycerol ranges preferably from 200 to 3000, inclusive, more preferably 300 to 800, inclusive, for example.

A proportion of the first component in the liquid component ranges preferably from 5% by mass to 100% by mass, inclusive, more preferably 20% by mass to 100% by mass, inclusive, further preferably 30% by mass to 100% by mass, inclusive. That is, the first component is a main component of the liquid component or an electrolyte solution. This sufficiently increases the function of the conductive polymer, and the function of the conductive polymer is maintained over a long period. Further, even when the electrolytic capacitor is used in a high temperature exceeding 135° C. (for example, 150° C.) for a long period, it is possible to make the liquid component remain in the electrolytic capacitor over the long period.

The liquid component may further contain, as a second component, at least one selected from the group consisting of a polyalkylene glycol having six or more alkylene glycol units and derivatives of the polyalkylene glycol. Since the second component has a longer molecular chain than a molecular chain of the first component, it is not so effective for swelling the conductive polymer. The second component, however, can easily infiltrate into pits in the dielectric layer because it is presented in a liquid state. Further, since the second component is likely to remain even in the electrolytic capacitor used beyond the electrolytic capacitor's guaranteed life, a minimum repairing function by the liquid component can be maintained. Accordingly, even when the electrolytic capacitor is used beyond the electrolytic capacitor's guaranteed life, it is possible to suppress an increase of the leakage current and thus avoid a short circuit.

Since the hybrid electrolytic capacitor does not become an open mode even when the liquid component is depleted, the leakage current increases by losing the repairing function by the liquid component. Further, use of the electrolytic capacitor beyond the electrolytic capacitor's guaranteed life may possibly cause a short circuit. By using the second component as well as the first component, it is easy to maintain a sufficient repairing function by the liquid component even beyond the electrolytic capacitor's guaranteed life.

The polyalkylene glycol having six or more alkylene glycol units (hereinafter, simply a polyalkylene glycol) and the derivatives of the polyalkylene glycol are comparatively low in viscosity and is thus excellent in handleability. Preferable examples of the polyalkylene glycol include polyethylene glycol, polypropylene glycol, a copolymer of ethylene glycol and propylene glycol, a copolymer of ethylene glycol and butylene glycol, and a copolymer of propylene glycol and butylene glycol. As the derivatives of the polyalkylene glycol, it is preferable to use, for example, polyethylene glycol glyceryl ether, polyethylene glycol diglyceryl ether, polyethylene glycol sorbitol ether, polypropylene glycol glyceryl ether, polypropylene glycol diglyceryl ether, polypropylene glycol sorbitol ether, or polybutylene glycol. These compounds may be used alone, or two or more of the compounds may be used in combination.

The polyalkylene glycol and the derivatives of the polyalkylene glycol are preferably low in affinity for a material constituting the sealing body. And the alkylene glycol unit preferably has as low hydrophobicity as possible. Since a propylene structure is higher in hydrophobicity than an ethylene structure, it is more preferable to use ethylene glycol and derivatives of ethylene glycol than propylene glycol and derivatives of propylene glycol.

An average molecular weight (weight average molecular weight) of the second component is preferably 280 or more, more preferably 300 or more, from the viewpoint of decreasing volatility of the second component. An average molecular weight exceeding 20000, however, increases the viscosity, so that it is sometimes difficult to exhibit sufficient capacitance of the capacitor at a low temperature. Accordingly, the average molecular weight is preferably 20000 or less, more preferably 6000 or less, further preferably 1000 or less.

When the liquid component contains the second component, a proportion of a total of the first and second components in the liquid component ranges preferably from 20% by mass to 100% by mass, inclusive, more preferably 50% by mass to 100% by mass, inclusive. By limiting the proportion of the total of the first and second components within the above range, the first component or the second component are allowed to entirely cover the dielectric layer in the electrolytic capacitor that is used beyond the electrolytic capacitor's guaranteed life. Accordingly, it is possible to increase an effect of suppressing the leakage current.

A ratio of the second component to 100 parts by mass of the first component ranges preferably from 10 parts by mass to 500 parts by mass, inclusive, more preferably 20 parts by mass to 350 parts by mass, inclusive, further preferably 30 parts by mass to 200 parts by mass, inclusive. By limiting the ratio of the second component to the first component within the above range, without largely impairing an action of the first component, the second component is allowed to entirely cover the dielectric layer in the electrolytic capacitor that is used beyond the electrolytic capacitor's guaranteed life. Accordingly, it is possible to increase an effect of suppressing the leakage current.

The liquid component may also contain a third component as well as the first component and the second component. The third component is not particularly limited and can contain, for example, a sulfone compound, a lactone compound, and a carbonate compound. Examples of the sulfone compound include sulfolane, dimethyl sulfoxide, and diethyl sulfoxide. Examples of the lactone compound include γ-butyrolactone and γ-valerolactone. Examples of the carbonate compound include dimethyl carbonate, diethyl carbonate, ethyl methyl carbonate, ethylene carbonate, propylene carbonate, and fluoroethylene carbonate. These compounds may be used alone or in combination of a plurality of compounds. A proportion of the third component in the liquid component is preferably smaller than 50% by mass.

The liquid component may be an electrolyte solution containing a supporting electrolyte. A concentration of the supporting electrolyte contained in the electrolyte solution ranges preferably from 2% by mass to 30% by mass, inclusive, more preferably from 10% by mass to 30% by mass, inclusive. This imparts excellent conductivity to the liquid component. In addition, the supporting electrolyte appropriately selected can also suppress deterioration of the conductive polymer. Examples of the supporting electrolyte include an ammonium salt of an inorganic acid, an amine salt of an inorganic acid, an alkyl-substituted amidine salt of an inorganic acid, and quaternized products of the acids, as well as an ammonium salt of an organic acid, an amine salt of an organic acid, an alkyl-substituted amidine salt of an organic acid, and quaternized products of the acids.

Hereinafter, the sealing body is further described. The material constituting the sealing body needs to be the polymer having no double bond in the main chain, and there can be used a thermosetting resin such as an epoxy resin. From the viewpoint of increasing the sealing property of the sealing body, however, it is preferable to use an elastic resin (or a rubber). The elastic resin is excellent not only in the sealing property, but also in handleability, because the elastic resin is no need to be cured by heating at a high temperature as in a case of the thermosetting resin.

As the elastic resin, it is preferable to use at least one selected from the group consisting of an ethylene propylene rubber and a fluororubber. These rubbers have high heat resistance and slow progress of deterioration even at a temperature of 150° C. or higher. And thus these rubbers are likely to maintain the sealing property even beyond the electrolytic capacitor's guaranteed life. Especially, the ethylene propylene rubber (EPT rubber) is preferable because the ethylene propylene rubber is more excellent in low temperature characteristics and more reasonable than the fluororubber. The ethylene propylene rubber can be a terpolymer having a diene monomer unit. A double bond derived from the diene monomer, however, exists in a side chain. Accordingly, in spite of having favorable elasticity, the ethylene propylene rubber has a main chain less likely to be deteriorated and is suitable for maintaining the sealing property over a long period. The ethylene propylene rubber has higher permeability for the liquid component than the butyl rubber, but still has sufficiently low permeability to suppress the vaporization of the first component and further the second component.

The sealing body is formed by, for example, kneading a rubber composition containing the elastic resin and an optional component, e.g., a filler, carbon black, a processing aid, or a crosslinking agent, and then forming the rubber composition into a crosslinked molded product with a heat press machine. Suitable examples of the crosslinking agent include, in addition to zinc oxide, peroxides such as benzoyl peroxide, dicumyl peroxide, and 2,5-dimethyl-2,5-bis(t-butylperoxy)hexane. The rubber composition may further contain, for example, a crosslinking aid or an anti-aging agent. The polymer having no double bond in the main chain needs to be a main component of a resin component included in the sealing body, and the elastic resin may partially (for example, less than 50% by mass) contain a polymer having a double bond in a main chain.

Next, the solid electrolyte layer is described. The conductive polymer included in the solid electrolyte layer is preferably, for example, polypyrrole, polythiophene, and polyaniline. These conductive polymers may be used alone, or two or more of the conductive polymers may be used in combination, or a copolymer of two or more monomers may be used. The solid electrolyte layer including such a conductive polymer can be expected to further improve the withstand voltage characteristics. A weight average molecular weight of the conductive polymer is not particularly limited and ranges, for example, from 1000 to 100000, inclusive.

In the present specification, polypyrrole, polythiophene, polyaniline, and the like mean polymers having, as a basic skeleton, polypyrrole, polythiophene, polyaniline, and the like, respectively. Therefore, polypyrrole, polythiophene, polyaniline, and the like can also include derivatives of polypyrrole, polythiophene, polyaniline, and the like, respectively. For example, polythiophene includes poly(3,4-ethylenedioxythiophene) (PEDOT) and the like.

A dopant may be added to the conductive polymer. That is, the solid electrolyte layer may include a dopant. And it is preferable that the solid electrolyte layer includes a polymer dopant from the viewpoint of suppressing dedoping of a dopant from the conductive polymer. Examples of the polymer dopant include polyanions such as polyvinylsulfonic acid, polystyrenesulfonic acid, polyallylsulfonic acid, polyacrylsulfonic acid, polymethacrylsulfonic acid, poly(2-acrylamido-2-methylpropanesulfonic acid), polyisoprenesulfonic acid, and polyacrylic acid. These polymer dopants may be used alone, or two or more of the polymer dopants may be used in combination. These polymer dopants may be a homopolymer or a copolymer of two or more monomers. Especially, polystyrenesulfonic acid (PSS) is preferable.

A weight average molecular weight of the dopant is not particularly limited but preferably ranges, for example, from 1000 to 100000, inclusive, in terms of facilitating formation of a homogeneous solid electrolyte layer.

The solid electrolyte layer may be formed by a method for applying a solution containing, for example, a monomer, a dopant, and an oxidant to the dielectric layer to cause chemical polymerization or electrolytic polymerization on the dielectric layer. The solid electrolyte layer, however, is preferably formed by a method for applying the conductive polymer to the dielectric layer, in terms of expecting to obtain excellent withstand voltage characteristics. That is, the solid electrolyte layer is preferably formed by impregnating the dielectric layer with a polymer dispersion containing a liquid dispersion medium and the conductive polymer dispersed in the liquid dispersion medium so as to form a film that covers at least a part of the dielectric layer, and then volatilizing the liquid dispersion medium from the film.

A concentration of the conductive polymer contained in the polymer dispersion preferably ranges from 0.5% by mass to 10% by mass, inclusive. An average particle diameter D50 of the conductive polymer preferably ranges, for example, from 0.01 μm to 0.5 μm, inclusive. Here, the average particle diameter D50 is a median diameter in a volume particle size distribution obtained by a particle size distribution measuring apparatus according to dynamic light scattering. The polymer dispersion having such a concentration is suitable for forming a solid electrolyte layer having an appropriate thickness and is easily impregnated into the dielectric layer.

When the conductive polymer is exposed to an alkali atmosphere or reacts with the supporting electrolyte in the liquid component to progress dedoping, a conductivity of the conductive polymer sometimes lowers. In order to suppress the dedoping, an acid may be dissolved in the liquid component. Preferable examples of the acid include phthalic acid, benzoic acid, nitrobenzoic acid, salicylic acid, trimellitic acid, and pyromellitic acid.

Hereinafter, an exemplary embodiment according to the present disclosure is more specifically described. The exemplary embodiment described below, however, is not for limiting the present disclosure.

Figure 2:
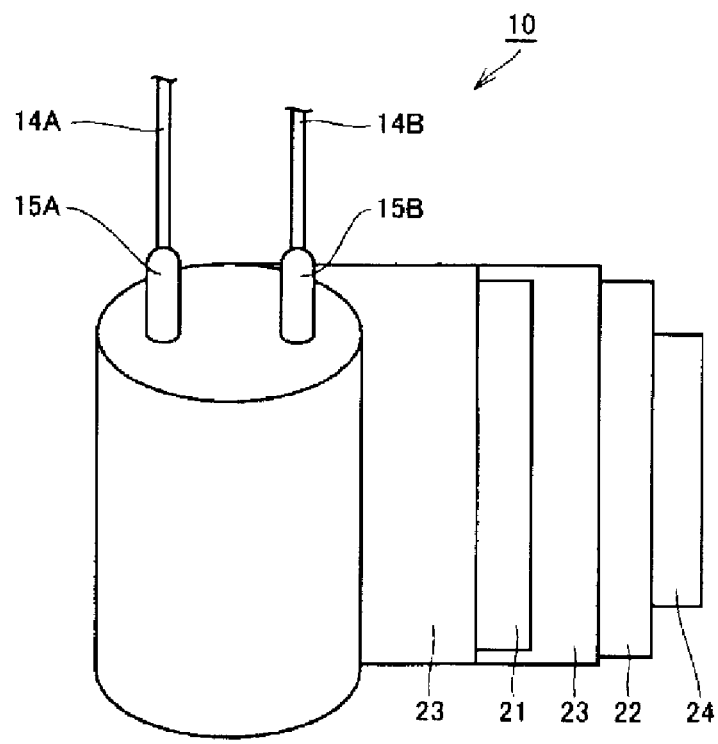
FIG. 2 is a schematic view for illustrating a configuration of a capacitor element according to the present exemplary embodiment.

FIG. 1 is a schematic sectional view illustrating an example of an electrolytic capacitor, and FIG. 2 is a schematic view obtained by developing a part of a capacitor element of the electrolytic capacitor.

The electrolytic capacitor includes, for example, capacitor element 10, bottomed case 11 that houses capacitor element 10, sealing body 12 that seals an opening of bottomed case 11, base plate 13 that covers sealing body 12, lead wires 14A, 14B that are lead out from sealing body 12 and penetrate base plate 13, lead tabs 15A, 15B that connect the lead wires to electrodes of capacitor element 10, respectively, and a liquid component (not shown). Bottomed case 11 is, at a part near an opening end, processed inward by drawing, and is, at the opening end, curled to swage sealing body 12.

Sealing body 12 includes a polymer having no double bond in a main chain. For example, an elastic resin such as an ethylene propylene rubber, a fluororubber, or a nitrile rubber is used. Such sealing body 12 has high heat resistance to be less likely to be deteriorated even in a high temperature environment exceeding 135° C., so that the sealing property is secured. The liquid component contains a first component and further a second component to maintain the liquid component's vapor pressure low even in a high temperature environment, hardly permeating sealing body 12.

Capacitor element 10 is produced from a wound body illustrated in FIG. 2. The wound body is a semi-manufactured product of capacitor element 10 and refers to a capacitor element in which a solid electrolyte layer has not yet been formed between anode body 21 on a surface of which a dielectric layer is provided and cathode body 22. The wound body includes anode body 21 connected to lead tab 15A, cathode body 22 connected to lead tab 15B, and separator 23.

Anode body 21 and cathode body 22 are wound with separator 23 interposed between the anode body and the cathode body. An outermost periphery of the wound body is fixed with fastening tape 24. FIG. 2 shows a partially developed wound body before the outermost periphery of the wound body is fixed.

Anode body 21 includes a metal foil whose surface is roughened so as to have projections and recesses, and a dielectric layer is formed on the metal foil having the projections and recesses. A conductive polymer is attached to at least a part of a surface of the dielectric layer to form a solid electrolyte layer. The solid electrolyte layer may cover at least a part of a surface of cathode body 22 and/or at least a part of a surface of separator 23. Capacitor element 10 in which the solid electrolyte layer has been formed is housed in an outer case together with the liquid component.

<<Method for Manufacturing Electrolytic Capacitor

Hereinafter, steps of one exemplary method for manufacturing the electrolytic capacitor are described.

(i) Step of Preparing Anode Body 21 Having Dielectric Layer

First, a metal foil as a raw material for anode body 21 is prepared. A type of the metal is not particularly limited, but it is preferred to use a valve metal such as aluminum, tantalum, or niobium, or an alloy including a valve metal, from the viewpoint of facilitating formation of a dielectric layer.

Next, a surface of the metal foil is roughened. By the roughening, a plurality of projections and recesses are formed on the surface of the metal foil. The roughening is preferably performed by etching the metal foil. The etching may be performed by, for example, a direct-current electrolytic method or an alternating-current electrolytic method.

Next, a dielectric layer is formed on the roughened surface of the metal foil. A method for forming the dielectric layer is not particularly limited, and the dielectric layer can be formed by subjecting the metal foil to an anodizing treatment. The anodizing treatment is performed by, for example, immersing the metal foil in an anodizing solution such as an ammonium adipate solution, followed by a heat treatment. The anodizing treatment may also be performed by applying a voltage to the metal foil that has been immersed in the anodizing solution.

Normally, a large foil of, for example, a valve metal (metal foil) is subjected to the roughening treatment and the anodizing treatment from the viewpoint of mass productivity. In this case, the treated foil is cut into a desired size to prepare anode body 21.

(ii) Step of Preparing Cathode Body 22

A metal foil can be used for cathode body 22 as with the anode body. A type of the metal is not particularly limited, but it is preferred to use a valve metal such as aluminum, tantalum, or niobium, or an alloy including a valve metal. A surface of cathode body 22 may be roughened as necessary.

(iii) Production of Wound Body

Next, a wound body is produced with use of anode body 21 and cathode body 22.

First, anode body 21 and cathode body 22 are wound with separator 23 interposed between the anode body 21 and the cathode body 22. At this time, the winding can be conducted while lead tabs 15A, 15B are rolled in the anode body 21, the cathode body 22, and the separator 23, to cause lead tabs 15A, 15B to stand up from the wound body as illustrated in FIG. 2.

As a material for separator 23, a nonwoven fabric can be used that includes, as a main component, for example, synthetic cellulose, polyethylene terephthalate, polybutylene terephthalate, polyphenylenesulfide, vinylon, nylon, aromatic polyamide, polyimide, polyamideimide, polyetherimide, rayon, or a vitreous material.

A material for lead tabs 15A, 15B is not particularly limited as long as the material is a conductive material. A material for lead wires 14A, 14B connected to lead tabs 15A, 15B, respectively, is not also particularly limited as long as the material is a conductive material.

Next, fastening tape 24 is disposed on an outer surface of cathode body 22 positioned at an outermost layer of wound anode body 21, cathode body 22, and separator 23, to fix an end of cathode body 22 with fastening tape 24. When anode body 21 is prepared by cutting a large metal foil, the wound body may further be subjected to an anodizing treatment in order to provide a dielectric layer on a cutting surface of anode body 21.

(iv) Step of Forming Capacitor Element 10

Next, the dielectric layer is impregnated with a polymer dispersion to form a film covering at least a part of the dielectric layer. The polymer dispersion contains a liquid dispersion medium and a conductive polymer dispersed in the liquid dispersion medium. The polymer dispersion may be a solution obtained by dissolving the conductive polymer in a solvent. Next, the formed film is dried to volatilize the liquid dispersion medium or the solvent from the film, forming a dense solid electrolyte layer covering at least a part of the dielectric layer. The conductive polymer is uniformly distributed in the polymer dispersion to easily form a uniform solid electrolyte layer. Thus, capacitor element 10 can be obtained.

The polymer dispersion can be obtained by, for example, a method for dispersing the conductive polymer in the liquid dispersion medium or a method for polymerizing a precursor monomer in the solvent and generating particles of the conductive polymer. Preferable examples of the polymer dispersion include poly(3,4-ethylenedioxythiophene) (PEDOT) doped with polystyrenesulfonic acid (PSS), i.e., PEDOT/PSS.

The liquid dispersion medium may be water, a mixture of water and a nonaqueous solvent, or a nonaqueous solvent. The nonaqueous solvent is not particularly limited, and a protic solvent and an aprotic solvent can be used, for example. Examples of the protic solvent include alcohols such as methanol, ethanol, propanol, butanol, ethylene glycol, and propylene glycol, formaldehyde, and ethers such as 1,4-dioxane. Examples of the aprotic solvent include amides such as N-methylacetamide, N,N-dimethylformamide, and N-methyl-2-pyrrolidone, esters such as methyl acetate, and ketones such as methyl ethyl ketone. The liquid dispersion medium may contain a liquid component that can be used as a first component, a second component, or a third component. In this case, the solid electrolyte layer may be formed without completely drying the liquid dispersion medium contained in the polymer dispersion. This allows the liquid dispersion medium to remain in a capacitor element and function as at least a part of the liquid component.

As a method for applying the polymer dispersion to a surface of the dielectric layer, for example, a method for immersing the wound body in the polymer dispersion housed in a container is simple and preferred. An immersion time depends on a size of the wound body, but ranges, for example, from 1 second to 5 hours, inclusive, preferably from 1 minute to 30 minutes, inclusive. In addition, impregnation is preferably performed under a reduced pressure, in an atmosphere ranging, for example, from 10 kPa to 100 kPa, inclusive, preferably from 40 kPa to 100 kPa, inclusive. Further, ultrasonic vibration may be applied to the wound body or the polymer dispersion while the wound body is immersed in the polymer dispersion. The drying after picking the wound body up from the polymer dispersion is performed at a temperature ranging preferably from 50° C. to 300° C., inclusive, more preferably from 100° C. to 200° C., inclusive, for example.

The step of applying the polymer dispersion to the surface of the dielectric layer and the step of drying the wound body may be repeated two or more times. These steps can be performed a plurality of times to increase coverage of the solid electrolyte layer on the dielectric layer.

As described above, the solid electrolyte layer is formed between anode body 21 and cathode body 22 to produce capacitor element 10. The solid electrolyte layer formed on the surface of the dielectric layer virtually functions as a cathode material.

(v) Step of Impregnating Capacitor Element 10 with Liquid Component

Next, capacitor element 10 is impregnated with the liquid component. A method for impregnating capacitor element 10 with the liquid component is not particularly limited. For example, a method for immersing capacitor element 10 in the liquid component housed in a container is simple and preferred. An immersion time depends on a size of capacitor element 10, and ranges, for example, from 1 second to 5 minutes, inclusive. Impregnation is preferably performed under a reduced pressure, in an atmosphere ranging, for example, from 10 kPa to 100 kPa, inclusive, preferably from 40 kPa to 100 kPa, inclusive.

(vi) Step of Encapsulating Capacitor Element

Next, capacitor element 10 is encapsulated. Specifically, first, capacitor element 10 is housed in bottomed case 11 so that lead wires 14A, 14B are positioned on an open upper surface of bottomed case 11. As a material for bottomed case 11, there can be used metals such as aluminum, stainless steel, copper, iron and brass, or alloys of these metals.

Next, sealing body 12 formed so as to allow lead wires 14A, 14B to penetrate the sealing body is disposed above capacitor element 10 so as to encapsulate capacitor element 10 in bottomed case 11. Next, bottomed case 11 is, at a part near an opening end, processed by transverse drawing, and is, at the opening end, curled to swage sealing body 12. Then, base plate 13 is disposed on a curled part of the bottomed case to complete the electrolytic capacitor illustrated in FIG. 1. Then, an aging treatment may be performed while a rated voltage is applied.

In the exemplary embodiment described above, a wound electrolytic capacitor has been described. The application range of the present disclosure, however, is not limited to the wound electrolytic capacitor and can also be applied to other electrolytic capacitors such as a chip electrolytic capacitor including a metal sintered body as an anode body, and a laminated electrolytic capacitor including a metal plate as an anode body.

EXAMPLES

Hereinafter, the present disclosure is described in further detail with reference to examples. The present disclosure, however, is not limited to the examples.

Example 1

In the present example, a wound electrolytic capacitor (Φ (diameter): 10.0 mm×L (length): 10.0 mm) having a rated voltage of 25 V and a rated electrostatic capacity of 330 μF was produced. Hereinafter, a specific method for manufacturing the electrolytic capacitor is described.

(Preparation of Anode Body)

A 100-μm-thick aluminum foil was subjected to etching to roughen a surface of the aluminum foil. Then, a dielectric layer was formed on the surface of the aluminum foil by an anodizing treatment. The anodizing treatment was performed by immersing the aluminum foil in an ammonium adipate solution and applying a voltage of 150 V to the aluminum foil. Then, the aluminum foil was cut into a size of 6 mm (length)×120 mm (width) to prepare an anode body.

(Preparation of Cathode Body)

A 50-μm-thick aluminum foil was subjected to etching to roughen a surface of the aluminum foil. Then, the aluminum foil was cut into a size of 6 mm (length)×120 mm (width) to prepare a cathode body.

(Production of Wound Body)

An anode lead tab and a cathode lead tab were connected to the anode body and the cathode body, respectively. And then the anode body and the cathode body were wound with a separator interposed between the anode body and the cathode body while the lead tabs were rolled in the anode body, the cathode body, and the separator. Ends of the lead tabs protruding from a wound body were connected to an anode lead wire and a cathode lead wire, respectively. Then, the produced wound body was subjected to an anodizing treatment again to form a dielectric layer at a cutting end of the anode body. Next, an end of an outer surface of the wound body was fixed with a fastening tape to complete the wound body.

(Preparation of Polymer Dispersion)

A mixed solution was prepared by dissolving 3,4-ethylenedioxythiophene and a polymer dopant, i.e., polystyrenesulfonic acid (PSS, weight average molecular weight 100000) in ion-exchanged water. While the mixed solution was stirred, iron (III) sulfate (oxidant) that had been dissolved in ion-exchanged water was added to the mixed solution to cause a polymerization reaction. After the polymerization reaction, a resultant reaction solution was dialyzed to remove unreacted monomers and an excessive oxidant, so that a polymer dispersion was obtained that contained about 5% by mass of polyethylene dioxythiophene doped with PSS (PEDOT/PSS).

(Formation of Capacitor Element)

The wound body was immersed in the polymer dispersion housed in a predetermined container in a reduced-pressure atmosphere (40 kPa) for 5 minutes, and then the wound body was picked up from the polymer dispersion. Next, the wound body that had been impregnated with the polymer dispersion was dried in a drying furnace at 150° C. for 20 minutes to form a solid electrolyte layer covering at least a part of the dielectric layer. Thus, a capacitor element was obtained.

(Impregnation with Liquid Component)

A liquid component was prepared by mixing 45 parts by mass of glycerol (GrOH) as a first component, 45 parts by mass of polyethylene glycol (PEG, weight average molecular weight 300, the same applies hereinafter) as second component, and 10 parts by mass of mono(ethyldimethylamine)phthalate as a supporting electrolyte. Next, the capacitor element was immersed in the resultant liquid component in a reduced-pressure atmosphere (40 kPa) for 5 minutes.

(Encapsulation of Capacitor Element)

The capacitor element that had been impregnated with the liquid component was housed in an outer case and an opening of the outer case was sealed with a sealing body to complete an electrolytic capacitor (A1) illustrated in FIG. 1. Thereafter, an aging treatment was performed at 130° C. for 2 hours while a rated voltage was applied. In a resin component for the sealing body, an elastic resin having no double bond in a main chain, i.e., an ethylene propylene rubber (EPT rubber) was contained as a main component.

Example 2

An electrolytic capacitor A2 was produced in the same manner as in Example 1 except for using 60 parts by mass of glycerol as the first component and 30 parts by mass of polyethylene glycol as the second component.

Example 3

An electrolytic capacitor A3 was produced in the same manner as in Example 1 except for using 20 parts by mass of glycerol as the first component and 70 parts by mass of polyethylene glycol as the second component.

Example 4

An electrolytic capacitor A4 was produced in the same manner as in Example 1 except for using 90 parts by mass of glycerol as the first component and no second component.

Example 5

An electrolytic capacitor A5 was produced in the same manner as in Example 1 except for using 20 parts by mass of glycerol as the first component, 50 parts by mass of polyethylene glycol as the second component, and further 20 parts by mass of ethylene glycol (EG) as a third component.

Example 6

An electrolytic capacitor A6 was produced in the same manner as in Example 1 except for using 60 parts by mass of diethylene glycol (DEG) as the first component and 30 parts by mass of polyethylene glycol as the second component.

Example 7

An electrolytic capacitor A7 was produced in the same manner as in Example 1 except for using 30 parts by mass of glycerol and 30 parts by mass of diethylene glycol (total 60 parts by mass) as the first component and 30 parts by mass of polyethylene glycol as the second component.

Example 8

An electrolytic capacitor A8 was produced in the same manner as in Example 1 except for using 60 parts by mass of polyglycerol (PG, weight average molecular weight 310, the same applies hereinafter) as the first component and 30 parts by mass of polyethylene glycol as the second component.

Example 9

An electrolytic capacitor A9 was produced in the same manner as in Example 1 except for using 30 parts by mass of polyglycerol as the first component and 60 parts by mass of polyethylene glycol as the second component.

Example 10

An electrolytic capacitor A10 was produced in the same manner as in Example 1 except for using 40 parts by mass of polyglycerol as the first component and 50 parts by mass of polyethylene glycol as the second component.

Comparative Example 1

An electrolytic capacitor B1 was produced in the same manner as in Example 1 except for using, as the elastic resin for the sealing body, a butyl rubber (IIR) in place of the EPT rubber.

Comparative Example 2

An electrolytic capacitor B2 was produced in the same manner as in Example 1 except for using no first component, 45 parts by mass of polyethylene glycol as the second component, and 45 parts by mass of ethylene glycol as the third component and using, as the elastic resin for the sealing body, a butyl rubber (IIR) in place of the EPT rubber.

Comparative Example 3

An electrolytic capacitor B3 was produced in the same manner as in Example 1 except for using no first component, 30 parts by mass of polyethylene glycol as the second component, and 60 parts by mass of ethylene glycol as the third component.

[Evaluation]

Initial electrostatic capacity and ESR were measured for the obtained electrolytic capacitors. Further, in order to evaluate long term reliability, the electrolytic capacitors were subjected to a test in which the electrolytic capacitor was retained at 150° C. for 2000 hours with a rated voltage applied to the electrolytic capacitor, and rates of change in capacitance (reduction rate, ΔC) and in ESR (increase rate, ΔESR) were evaluated. Table 1 shows evaluation results.

TABLE 1

| | Sealing body | Liquid component | | | Evaluation | | | | | |
| | | | | | Capacitance (μF) | | | ESR (mΩ) | | |
| | | First | Second | Third | Initial | Posttest | ΔC | Initial | Posttest | ΔESR |
| --- | --- | --- | --- | --- | --- | --- | --- | --- | --- | --- |
| A1 | EPT | GrOH | PEG | — | 326 | 258 | −20.9 | 11 | 22 | 100 |
| A2 | EPT | GrOH | PEG | — | 323 | 272 | −15.8 | 11 | 20 | 82 |
| A3 | EPT | GrOH | PEG | — | 328 | 233 | −29.0 | 13 | 38 | 192 |
| A4 | EPT | GrOH | — | — | 300 | 278 | −7.3 | 11 | 18 | 64 |
| A5 | EPT | GrOH | PEG | EG | 330 | 255 | −22.7 | 11 | 35 | 218 |
| A6 | EPT | DEG | PEG | — | 328 | 243 | −25.9 | 13 | 32 | 146 |
| A7 | EPT | GrOH/DEG | PEG | — | 328 | 260 | −20.7 | 12 | 30 | 150 |
| A8 | EPT | PG | PEG | — | 313 | 290 | −7.3 | 13 | 18 | 38 |
| A9 | EPT | PG | PEG | — | 320 | 275 | −14.1 | 15 | 22 | 47 |
| A10 | EPT | PG | PEG | — | 326 | 283 | −13.2 | 14 | 20 | 43 |
| B1 | IIR | GrOH | PEG | — | 325 | 106 | −67 | 11 | 86 | 682 |
| B2 | IIR | — | PEG | EG | 329 | 56 | −83 | 11 | 153 | 1291 |
| B3 | EPT | — | PEG | EG | 332 | 32 | −90 | 10 | 177 | 1670 |

As shown from the results of Table 1, in each of the electrolytic capacitors obtained, absolute values for ΔC and ΔESR are getting smaller and a heat resistance is getting more excellent, as a ratio of the first component with respect to the second component increases. In addition, the first component having three hydroxy groups gives more preferable results than the first component having two hydroxy groups. Any of the first components, however, can be expected to give reasonable effects because the first components each have a similar structure.

On the other hand, in the cases of using the liquid component containing no first component but containing the second and third components, it is shown that the absolute values for ΔC and ΔESR become very large. This result indicates that most of the third component vaporized. In addition, it is shown that the second component cannot be expected to give the action of increasing the function of the conductive polymer.

Even in the cases of using the first component, when the material for the sealing body is a polymer having a double bond in a main chain (Comparative Example 1, B1), the absolute values for ΔC and ΔESR are large. This indicates that deterioration of the sealing body progressed to cause the first component to vaporize from, for example, a crack.

The present disclosure can be applied to a so-called hybrid electrolytic capacitor that includes a solid electrolyte layer covering at least a part of a dielectric layer, and a liquid component in contact with the solid electrolyte layer. Particularly, the present disclosure can be preferably applied to an electrolytic capacitor that is used at a temperature exceeding 135° C. (for example, an electrolytic capacitor having a guaranteed temperature of 150° C.).

What is claimed is:

1. An electrolytic capacitor comprising:
   a capacitor element that includes an anode body having a dielectric layer, and a solid electrolyte layer in contact with the dielectric layer;
   a liquid component in contact with the solid electrolyte layer;
   an outer case that houses the capacitor element and the liquid component; and
   a sealing body that seals an opening of the outer case, wherein:
   the liquid component contains a first component and a second component,
   the first component is an aliphatic polyol compound that has two or more hydroxy groups per molecule,
   the aliphatic polyol compound includes at least one of a compound that has a $C_3$ carbon chain in a main chain and a compound that has no $C_3$ carbon chain but has one to four ether oxygen atoms in a main chain,
   the second component is at least one selected from a group consisting of a polyalkylene glycol having six or more alkylene glycol units and derivatives of the polyalkylene glycol,
   a mass ratio of the second component to the first component ranges from 10 parts by mass to 500 parts by mass, inclusive, with respect to 100 parts by mass of the first component,
   a proportion of a total of the first component and the second component in the liquid component ranges from 70% by mass to 98% by mass, inclusive,
   the liquid component further contains a supporting electrolyte,
   the sealing body includes a polymer having no double bond in a main chain, and
   the polymer having no double bond in the main chain is an elastic resin.

2. The electrolytic capacitor according to claim 1, wherein the aliphatic polyol compound is at least one selected from a group consisting of glycerol and polyglycerol.

3. The electrolytic capacitor according to claim 2, wherein an average molecular weight of the second component ranges from 280 to 20000, inclusive.

4. The electrolytic capacitor according to claim 1, wherein a proportion of the first component in the liquid component is equal to or more than 20% by mass and less than 60% by mass.

5. The electrolytic capacitor according to claim 4, wherein an average molecular weight of the second component ranges from 280 to 20000, inclusive.

6. The electrolytic capacitor according to claim 1, wherein an average molecular weight of the second component ranges from 280 to 20000, inclusive.

7. The electrolytic capacitor according to claim 1, wherein the elastic resin is at least one selected from a group consisting of an ethylene propylene rubber and a fluororubber.

8. The electrolytic capacitor according to claim 1, wherein the supporting electrolyte includes at least one selected from the group consisting of an ammonium salt of an inorganic acid, an amine salt of an inorganic acid, an alkyl-substituted amidine salt of an inorganic acid, an ammonium salt of an organic acid, an amine salt of an organic acid, an alkyl-substituted amidine salt of an organic acid, and quaternized products thereof.

* * * * *